United States Patent
Hölzer

(10) Patent No.: US 6,709,236 B1
(45) Date of Patent: Mar. 23, 2004

(54) HIGH-SPEED TURBO PUMP

(75) Inventor: Rainer Hölzer, Hürth (DE)

(73) Assignee: Leybold Vakuum GmbH, Cologne (DE)

( * ) Notice: Subject to any disclaimer, the term of this patent is extended or adjusted under 35 U.S.C. 154(b) by 0 days.

(21) Appl. No.: 10/130,439

(22) PCT Filed: Nov. 1, 2000

(86) PCT No.: PCT/EP00/10776
§ 371 (c)(1),
(2), (4) Date: May 15, 2002

(87) PCT Pub. No.: WO01/36826
PCT Pub. Date: May 25, 2001

(30) Foreign Application Priority Data

Nov. 18, 1999 (DE) .......................... 199 55 517

(51) Int. Cl.[7] .............................. F04D 29/04
(52) U.S. Cl. ...................... 415/229; 384/513
(58) Field of Search .................. 415/90, 107, 119, 415/142, 170.1, 229, 232; 384/513, 515, 516

(56) References Cited

U.S. PATENT DOCUMENTS

| | | | |
|---|---|---|---|
| 2,991,926 A | | 7/1961 | Diefenderfer ............... 230/116 |
| 3,880,481 A | * | 4/1975 | George ...................... 384/513 |
| 4,181,379 A | * | 1/1980 | Letts .......................... 384/465 |
| 5,139,396 A | * | 8/1992 | Suzuki et al. ................ 415/90 |
| 5,427,458 A | * | 6/1995 | Sanchez ..................... 384/516 |

FOREIGN PATENT DOCUMENTS

DE 19511430 A1 10/1996

OTHER PUBLICATIONS

Umrath "Fundamentals of Vakuum Technology", Sep. 1998, Leybold Vakuum GmbH XP002161333—p 46.

* cited by examiner

Primary Examiner—Edward K. Look
Assistant Examiner—Richard A. Edgar
(74) Attorney, Agent, or Firm—Fay, Sharpe, Fagan, Minnich & McKee, LLP

(57) ABSTRACT

A ball bearing (18) that carries a rotor side portion of a rotor shaft (16) includes an inner race (23), an outer race (24), and a plurality of balls (25). The inner race has an enlarged end face (S1) which supports a supporting part (22) of a rotor (13). The enlarged end face has a diameter (D1) which is at least as large as a reference diameter (D3) minus 34% of a diameter of the balls (25). The flexural strength of the rotor shaft is increased at the location of the ball bearing (18). The natural bending frequency also increases and is caused to be above an operating frequency of the rotor shaft. Resonances are also avoided.

8 Claims, 1 Drawing Sheet

HIGH-SPEED TURBO PUMP

BACKGROUND OF THE INVENTION

The present invention refers to a high-speed turbo pump, and in particular to a turbo molecular pump or a circulation fan.

During operation of fast rotating shafts, a situation may occur in which the natural bending frequency equals or approximates the rotary frequency of the rotor. In such cases, undesired bending vibrations of the rotor shaft occur that could result in the destruction of the machine. Also when running up the rotor shaft to its operating number of rotations, the natural bending frequency often has to be passed. With mechanically supported systems having an over-mounted rotor, the transition from the rotor-side bearing to the rotor frequently is a spot of very limited flexural strength.

Generally, the natural bending frequency of a rotor shaft is reached only with turbo machines rotating very fast. The term "high-speed turbo machine" refers to a machine with a number of rotations above about 27,000 rpm.

Turbo molecular pumps are known in which the rotor shaft is supported in cantilevered fashion in steel ball bearings or hybrid ball bearings (ceramic ball bearings). At the lower end, the rotor shaft has a portion of large diameter to which magnets are fastened which are part of an electric motor driving the rotor shaft. The upper shaft section on which the rotor is mounted, has a lesser diameter and it is supported by a ball bearing at the transition to the thicker shaft section.

It is an object of the present invention to provide a high-speed turbo machine with increased security against undesirable resonant vibrations.

SUMMARY OF THE INVENTION

According to the invention, the object is solved with the features of claim 1. Accordingly, the bearing of the rotor shaft is improved over the prior system in that a ball bearing is used whose end face supporting the rotor is enlarged.

This enlargement is achieved by enlarging the first end face of the inner race of the ball bearing towards the outside. Thus, at this location, the inner bending moments of the rotor shaft can be transmitted with lesser deformation. The flexural strength increases and, thus, the bending frequency also increases. The bending at rotary frequencies below the natural bending frequency decreases. By increasing the flexural strength, the natural bending frequency is increased so that it can no longer be reached by the operating frequency. Thus, undesirable resonant vibrations are avoided.

The inner diameter of the ball bearing is fixedly determined by the shaft diameter of the rotor shaft. According to the invention, the outer diameter of the inner ring is increased, whereby the supporting end face of the inner race is enlarged. This end face has an outer diameter that is at least as large as the reference diameter of the ball bearing minus 34% of the ball diameter. In this manner, a relatively large end face is obtained at which the supporting part of the rotor is supported. The end face of the supporting part should be at least as large as the first end face of the inner race of the ball bearing cooperating therewith, so as to obtain a support over a large surface.

One advantage of the present invention is that it increases the flexural strength of the rotor shaft.

Another advantage resides in increasing the natural bending frequency of the bearing shaft above its operating frequency.

Another advantage resides in avoiding resonances.

Still further advantages of the present invention will become apparent to those of ordinary skill in the art upon reading and understanding the following brief description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
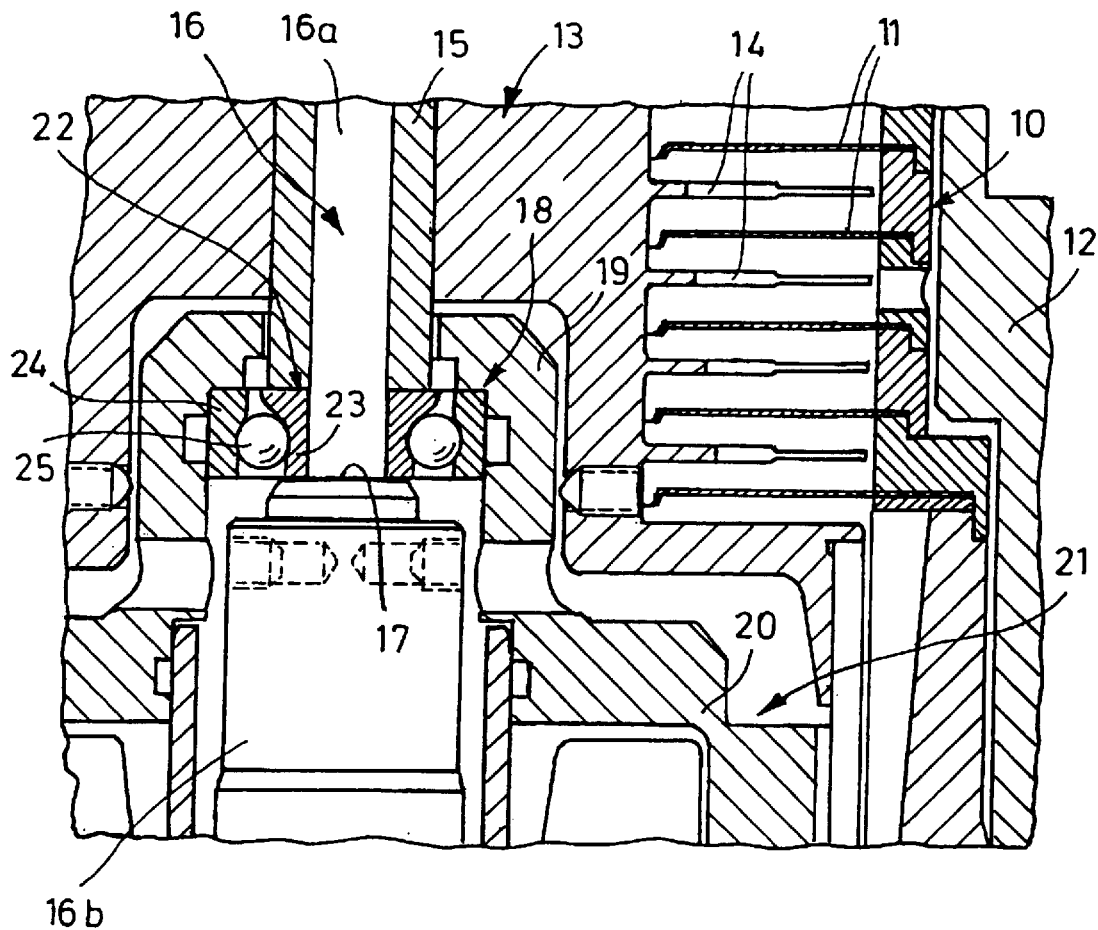
FIG. 1 illustrates a partial sectional view of a turbo molecular pump.

FIG. 1 illustrates a partial sectional view of a turbo molecular pump. The pump comprises a stator 10 with a plurality of inward projecting stator discs 11, the stator being mounted in a housing 12. Further, a rotor 13 is provided that comprises a plurality of radially projecting rotor discs 14 that extend between the stator discs 11. The distances between the stator and rotor discs are in the order of millimeters. When the circumferential velocity at the outer edge of the rotor discs reaches the order of the average thermal velocity of the gas molecules to be pumped, the desired magnitude of the pump effect has been obtained. This is true for numbers of rotations of the rotor of about 36,000 rpm to up to 72,000 rpm.

The rotor 13 comprises a tube 15 enclosing a rotor shaft 16. The rotor shaft comprises a portion 16a with a small diameter and a portion 16b with a large diameter. At the transition between the portions 16a, 16b, an annular shoulder 17 is provided against which the inner race of a ball bearing 18 abuts, which bearing supports the small diameter portion 16a. The ball bearing 18 is seated in a receptacle 19 of a motor housing 20 that contains the stator windings of a motor 21 driving the rotor shaft 16. The motor 21 surrounds the large diameter shaft portion 16b and drives the same directly. The rotor shaft 16 is arranged with a vertical axis that is supported above the motor 21 by the ball bearing 18 and below the motor 21 by a further ball bearing not illustrated. The portion 16a on which the rotor 13 is seated extends freely upward.

The lower end of the tube 15 forms a supporting part 22 by which the rotor 13 is supported at the inner race 23 of the ball bearing 18. Thus, the inner race 23 is axially fixed between the supporting part 22 and the annular shoulder 17. The outer race 24 of the ball bearing 18 is mounted in the receptacle 19 of the motor housing 20 with an elastically coupled seat. Between the inner race 23 and the outer race 24, the balls 25 and, possibly, a cage is disposed.

Figure 2:
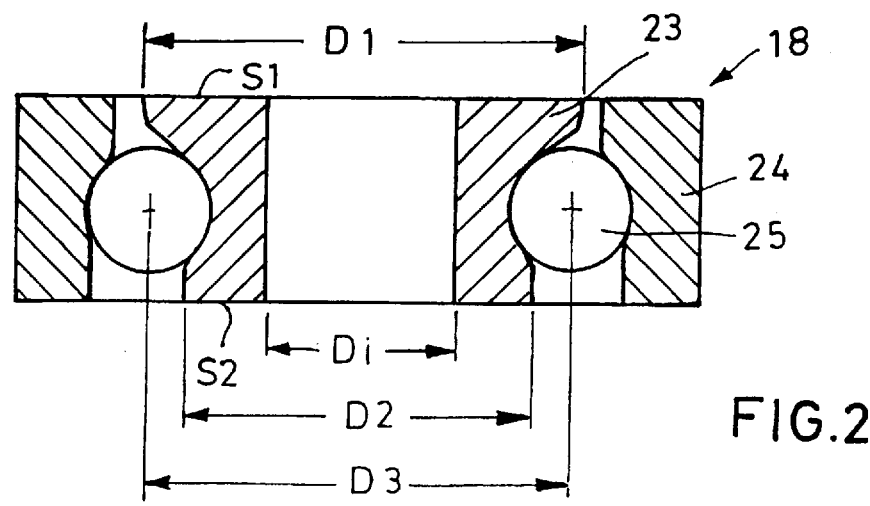
FIG. 2 is an enlarged view of the ball bearing with the end face diameter enlarged on one side.

As is obvious from FIG. 2, the inner race 23 of the ball bearing 18 comprises a cylindrical throughbore with the diameter $D_i$. The inner race 23 has a first annular end face S1 a the top surface, which is abutted by the supporting part 22, and a second end face S2 abutting the annular shoulder 17 of the rotor shaft 16. The outer diameter D1 of the end face of the inner race is at least as large as the diameter of the groove bottom plus 0.16 times the ball diameter or, in other words: as large as the reference diameter D3 minus 0.34 times the ball diameter. The sizing starts from an inner race corresponding to a deep groove ball bearing. The end face S1 or the end face S2 or both end faces may have an enlarged diameter. In the present case, the diameter D1 is even larger than the reference diameter D3 or the diameter of the ball track that the centers of the balls 25 of the ball bearing 18 run through.

The ball bearing 18 is a radial/axial bearing. The bottom surface of the tube 15 or the supporting part 22 abuts the end face S1 all over and covers it entirely. This provides a large-surface pressure contact between the supporting part 22 and the inner race 23, resulting in an increase of the flexural strength of the shaft 16 at the position of the ball bearing 18. Thus, the natural bending frequency of the rotor shaft is increased such that it lies above the operating frequency. The enlarged end face S1 transmits forces by the entire bottom surface of the supporting part 22 belonging to the rotor 13, but in particular on the portions of the larger radii.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A high-speed turbo machine comprising:
   a stator and a rotor:
   a rotor shaft supported in ball bearings, the rotors-side ball bearing having:
      an inner race mounted between an annular shoulder of the rotor shaft and a supporting part of the rotor, a first end face facing the supporting part having an outer diameter that is at least as large as a reference diameter of the ball bearing minus 34% of the ball diameter.

2. The turbo machine of claim 1 wherein the first end face of the inner race of the ball bearing is larger than an opposite second end face.

3. The turbo machine of claim 1 wherein the turbo machine includes a turbomolecular pump.

4. The turbo machine of claim 1 wherein the turbo machine includes a circulation fan.

5. The turbo machine of claim 1 wherein the inner race outer diameter is larger than the reference diameter.

6. A turbomolecular pump comprising:
   a stator;
   a rotor;
   a rotor shaft which defines an annular shoulder from which a reduced diameter portion of the rotor shaft extends for supporting the rotor;
   a tubular element surrounding the reduced diameter portion of the rotor shaft and terminating at an end which is displaced from the rotor shaft shoulder;
   a high speed rotary bearing including:
      an outer race supported on the stator,
      an inner race which surrounds a portion of the rotor shaft reduced diameter portion between the shoulder and the end of the tubular element part such that supporting forces for the rotor are carried across the inner race, the inner race defining an inner end faces which abuts the tubular element end and an outer end face which abuts the shoulder, the inner race further defining and a groove extending around an outer periphery thereof, the groove defining a groove diameter,
      a plurality of balls disposed between the inner and outer races and received in the inner race groove, each ball having a common ball diameter and each contacting the inner race at a single point and the outer race at a single point, and
      the inner face of the inner bearing having an outer diameter at least as large as the groove diameter plus 16% of the ball diameter and at least as large as a diameter of the tubular element end.

7. A high seed turbo machine comprising:
   a stator and a rotor, the rotor including a tubular supporting part, a bottom end of the supporting part has a supporting part diameter;
   a rotor shaft which supports the rotor, the rotor shaft having a larger diameter portion that defines a bearing supporting shoulder and a smaller diameter portion extending from the shoulder and through the supporting part to support the rotor;
   a high speed ball bearing assembly which enables the rotor and rotor shaft to rotate with an operating frequency of at least 27,000 rpm, the ball bearing assembly having:
      an inner race mounted between the annular shoulder of the rotor shaft and the supporting part of the rotor, a first end face of the inner race abutting and supporting the supporting part and having an outer diameter that is at least as large as (a) a reference diameter of the ball bearing minus 34% of the ball diameter, and (b) the supporting part diameter, increasing flexural strength of the rotor shaft adjacent the bearing sufficiently that a natural bending frequency of the rotor shaft is not reached at speeds at and below the operating frequency.

8. The high speed turbomolecular machine of claim 7 wherein the first end face of the inner race outer diameter is at least as large as the reference diameter.

* * * * *